US010228511B2

(12) United States Patent
LeGrange et al.

(10) Patent No.: US 10,228,511 B2
(45) Date of Patent: Mar. 12, 2019

(54) INTEGRATED LOW-VOLTAGE CMOS-COMPATIBLE ELECTRO-OPTIC MODULATOR

(71) Applicant: LGS Innovations LLC, Herndon, VA (US)

(72) Inventors: Jane D. LeGrange, Princeton, NJ (US); Mihaela Dinu, Freehold, NJ (US); Alex Pidwerbetsky, Randolph, NJ (US)

(73) Assignee: LGS Innovations LLC, Herndon, VA (US)

( * ) Notice: Subject to any disclaimer, the term of this patent is extended or adjusted under 35 U.S.C. 154(b) by 0 days.

(21) Appl. No.: 15/653,947

(22) Filed: Jul. 19, 2017

(65) Prior Publication Data

US 2018/0088274 A1    Mar. 29, 2018

Related U.S. Application Data

(60) Provisional application No. 62/400,708, filed on Sep. 28, 2016.

(51) Int. Cl.

| *G02B 6/26* | (2006.01) |
|---|---|
| *G02B 6/12* | (2006.01) |
| *G02F 1/00* | (2006.01) |
| *G01D 5/353* | (2006.01) |
| *G01J 9/02* | (2006.01) |
| *G01K 11/32* | (2006.01) |
| *G01L 1/24* | (2006.01) |

(52) U.S. Cl.
CPC ........... *G02B 6/12* (2013.01); *G01D 5/35316* (2013.01); *G01J 9/0246* (2013.01); *G01K 11/3206* (2013.01); *G01L 1/246* (2013.01); *G02F 1/0018* (2013.01)

(58) Field of Classification Search
CPC ...... G02B 6/12; G01L 1/246; G01K 11/3206; G01D 5/35316; G02F 1/0018; G01J 9/0246

See application file for complete search history.

(56) References Cited

U.S. PATENT DOCUMENTS

| 6,466,703 | B1 | 10/2002 | Ionov |
| 6,643,429 | B2 | 11/2003 | Robinson et al. |
| 7,546,017 | B2 | 6/2009 | Siga et al. |
| 7,606,455 | B2* | 10/2009 | Barrios ............... H01S 3/0632 385/131 |
| 9,335,568 | B1 | 5/2016 | Yap et al. |
| 2006/0274995 | A1* | 12/2006 | Lee .................. G02B 6/12011 385/37 |

(Continued)

*Primary Examiner* — Ellen Kim
(74) *Attorney, Agent, or Firm* — Baker & Hostetler LLP (57) ABSTRACT

A slot waveguide for electro-optic modulation is provided. The slot waveguide includes a slot and Bragg gratings defined by outer walls of the slot. The Bragg gratings are configured to slow an optical signal. The slot defines a low-refractive index region and the Bragg gratings spaced apart by the slot define a high-refractive index region. The slot waveguide includes a pair of electrodes extending parallel and adjacent to the slot waveguide. The electrodes are configured to carry an electrical modulation signal to induce a change in a phase of the optical signal. The slot of the slot waveguide is at least partially filled with an electro-optic polymeric material poled in a direction orthogonal to a direction of propagation of the optical signal in the slot waveguide.

20 Claims, 4 Drawing Sheets

(56) References Cited

U.S. PATENT DOCUMENTS

2010/0002994 A1* 1/2010 Baehr-Jones .......... B82Y 20/00
   385/32
2010/0322559 A1* 12/2010 Ogawa .................. G02B 6/124
   385/37
2013/0182730 A1* 7/2013 Fan ........................ H01S 5/141
   372/20

* cited by examiner

INTEGRATED LOW-VOLTAGE CMOS-COMPATIBLE ELECTRO-OPTIC MODULATOR

CROSS-REFERENCE TO RELATED APPLICATION

The present application claims priority of filing date to the U.S. Provisional Patent Appl. No. 62/400,708, filed Sep. 28, 2016, entitled "INTEGRATED LOW-VOLTAGE CMOS COMPATIBLE MODULATOR," which is incorporated by reference in its entirety herein.

TECHNICAL FIELD

The present application generally relates to a low voltage modulator for radio frequency (RF) photonics applications. More particularly, the present application relates to a low-voltage electro-optic modulator that uses a width-modulated slot waveguide that contains a high electro-optic coefficient polymer in the slot.

BACKGROUND

RF photonics enables improved sensitivity and signal processing capabilities for the collection and transmission of RF data. The enabling component in RF photonics is the electro-optic modulator, which imprints the RF signal onto an optical carrier. Transmission and processing of RF signals in the photonic domain provides the advantages of photonics, such as large bandwidth, low transmission loss over long distances, and lower size, weight, and power (SWaP) consumption of the device or subsystem.

A multitude of RF waveform synthesis and complex RF filtering functions have been demonstrated using photonics. More recently, complex photonic devices for RF beamforming or programmable filters have been studied on both centimeter sized silicon and silicon nitride photonic chips.

The efficiency of transferring RF signals onto an optical carrier depends on the voltage sensitivity of the modulator, expressed as $V_\pi$, which is the voltage required to drive a half-wave phase shift in the optical signal. The voltage $V_\pi$ impacts the energy efficiency of a photonic link, the achievable device size, as well as signal quality metrics such as the noise figure. Conventionally, voltage efficiencies of about 1-2 V with a bandwidth of 10 GHz limit the magnitude and spectrum of RF signals that can be processed without pre-amplification and channelization in the RF domain. This results in a critical bottleneck for realizing the full potential of RF photonics.

Accordingly, there is a need in the art for addressing the limitations of conventional electro-optic modulators with respect to the efficiency, voltage sensitivity, and performance of RF photonics systems, and for addressing the foregoing as well as other drawbacks of conventional systems.

SUMMARY

The foregoing needs are met, to a great extent, by the present application.

In accordance with one aspect of the application, a method of modulating an optical signal includes receiving an unmodulated optical signal to an input of a slot waveguide. The slot waveguide includes a slot in a direction of propagation of the unmodulated optical signal, the slot being filled at least partially with an electro-optic polymer poled orthogonal to the direction of propagation. The slot waveguide includes Bragg gratings defined along sides of the slot to slow the optical signal. The method includes modulating a phase of the unmodulated optical signal by providing an electrical input signal to the slot waveguide via a pair of electrodes. The method includes outputting a modulated optical signal with the modulated phase. In accordance with another aspect of the application, an electro-optic modulator for modulating an unmodulated optical signal is provided. The electro-optic modulator includes a slot waveguide configured to propagate an optical signal. The slot waveguide includes a slot and Bragg gratings defined by outer walls of the slot. The Bragg gratings are configured to slow the optical signal. The electro-optic modulator includes a pair of electrodes extending parallel and adjacent to the slot waveguide. Electrodes in the pair are configured to carry an electrical modulation signal to induce a change in a phase of the optical signal. The slot of the slot waveguide is at least partially filled with an electro-optic polymer poled in a direction orthogonal to a direction of propagation of the optical signal in the slot waveguide.

In accordance with another aspect of the application, a slot waveguide for electro-optic modulation is provided. The slot waveguide includes a slot and Bragg gratings defined by outer walls of the slot. The Bragg gratings are configured to slow an optical signal. The slot defines a low-refractive index region and the Bragg gratings spaced apart by the slot define a high-refractive index region. The slot waveguide includes a pair of electrodes extending parallel and adjacent to the slot waveguide. The electrodes are configured to carry an electrical modulation signal to induce a change in a phase of the optical signal. The slot of the slot waveguide is at least partially filled with an electro-optic polymeric material poled in a direction orthogonal to a direction of propagation of the optical signal in the slot waveguide.

There has thus been outlined, rather broadly, certain aspects of this patent application (hereinafter "application") in order that the detailed description thereof herein may be better understood, and in order that the present contribution to the art may be better appreciated. There are, of course, additional aspects that will be described below and which form the subject matter of the claims appended hereto.

BRIEF DESCRIPTION OF THE DRAWINGS

The above-mentioned and other features and advantages of this application, and the manner of attaining them, will become apparent and be better understood by reference to the following description of one aspect of the application in conjunction with the accompanying drawings, wherein.

It will be appreciated by one of ordinary skill in the art that similar elements or components in different drawing

DETAILED DESCRIPTION

Various aspects of the present application are directed to an electro-optic modulator for RF photonics applications, although digital, analog, and other low-SWaP applications are also contemplated. In one aspect, a silicon (Si) slot width-modulated (Bragg) waveguide is described. The waveguide includes a periodically modulated waveguide width (e.g., a uniform Bragg grating) to enhance the photonic group index. The periodic width modulation is implemented as recesses and protrusions along the walls of the slot. The waveguide includes a polymer in the waveguide slot having a high electro-optic coefficient.

An exemplary objective of the present application is to provide a method of making or manufacturing a complementary metal oxide semiconductor (CMOS)-compatible high-speed electro-optic modulator exhibiting voltage efficiencies or sensitivities less than 1 V. In one aspect, the electro-optic modulator may have a combination of attributes and features including, but not limited to a voltage efficiency of the electro-optic modulator being less than 0.5 V, for example, of the order of 0.1 V for a bandwidth of 100 GHz. In one aspect, the insertion loss is less than 5 dB, and in another aspect, the insertion loss ranges from 2 to 5 dB.

In one aspect of this patent application, a modulator in a Si-photonics platform is described. The modulator includes periodic nanostructures defined in a silicon waveguide. An electro-optic (EO) polymer is deposited on the Si waveguide. The EO polymer is poled in a plane orthogonal to the light propagation vector. The fabrication of the Si-photonics platform having a modulator including the EO polymer exhibiting a very low $V_\pi$ is highly desirable. The combination of the electro-optic polymer and width-modulated slot waveguide facilitate a reduction in the required modulator drive voltage, hence making the modulator highly sensitive for modulation by a low voltage signal in the RF domain.

In another aspect of this patent application, the modulator may be integrated with a laser and other components for implementing a low SWaP RF photonic link.

Figure 1:
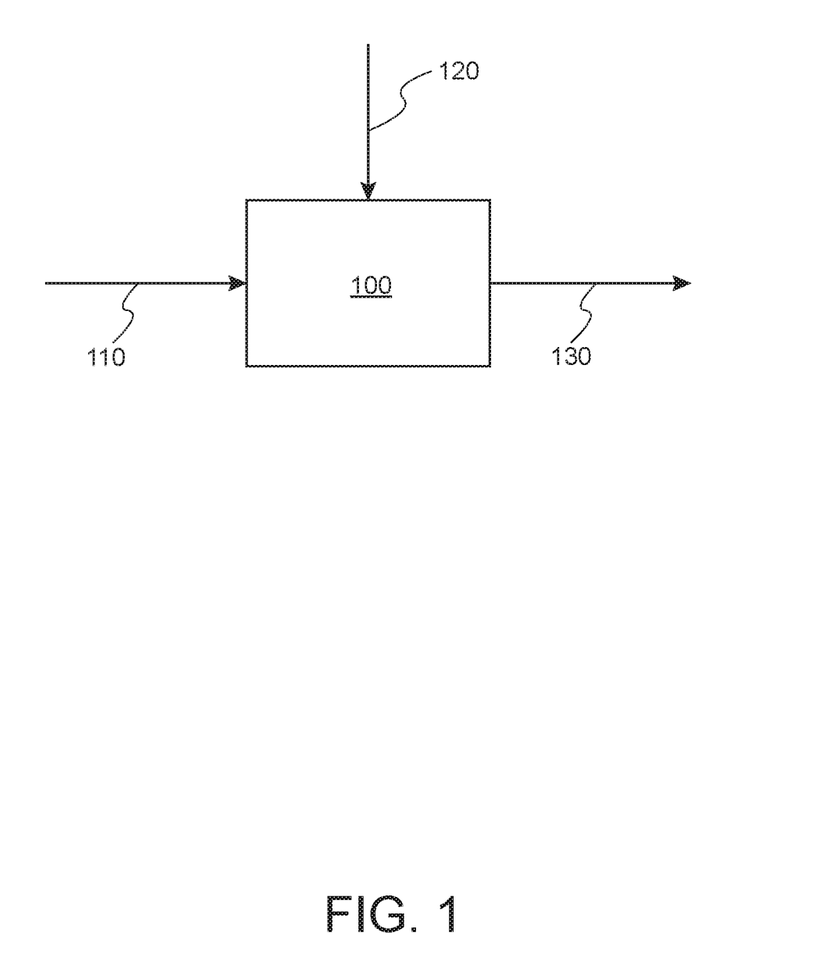
FIG. 1 is a schematic diagram of an electro-optic modulator, in accordance with an aspect of this patent application.

Referring now to FIG. 1, a schematic diagram of an electro-optic modulator 100 (EO modulator 100) is described, according to one aspect of the application. FIG. 1 may be considered a top view of the electro-optic modulator 100 showing input, modulation, and output signals. The electro-optic modulator 100 may be configured to receive an optical input signal 110. The optical input signal 110 may be an unmodulated light signal such as light from a laser. Alternatively, a pre-modulated light signal from a laser or other photonic network component may also be used. Although not shown in FIG. 1, the optical input signal 110 propagates through a waveguide (e.g., an optical fiber) prior to being input to the electro-optic modulator 100. Standard connectors or chip-level micro/nano connectors may be used to couple the optical input signal 110 to the EO modulator 100.

The electro-optic modulator 100 may also be configured to receive an electrical input signal 120, which may be a radio frequency (RF) signal. The electrical input signal 120 may be delivered to an electrode (discussed with respect to FIGS. 2 and 3) of the electro-optical modulator 100, for example, as a voltage signal. The electrical input signal 120 (shown in FIG. 1) may induce a change in the refractive index of a waveguide on the EO modulator 100 (discussed with respect to FIGS. 2 and 3) such that the optical phase of at least one portion of the optical input signal 110 is altered. In this sense, the electrical input signal 120 may also be interchangeably referred to as the electrical modulation signal 120. The electro-optic modulator 100 produces an output optical signal 130 that is a modulated version of the optical input signal 110. The output optical signal 130 may be coupled to another waveguide (e.g., another optical fiber) for further transport and/or processing.

It will be appreciated that the schematic shown in FIG. 1 may include additional components needed for inputting and outputting various signals (optical and RF/electrical). For example, filters, collimators, couplers, splitters, multiplexers, etc., may be used in conjunction with the electro-optical modulator 100, as will be appreciated by one of ordinary skill in the art in view of this patent application. Through photonic integration processes such as CMOS-compatible silicon photonics fabrication, electrical components may also be integrated with the modulator.

Figure 2:
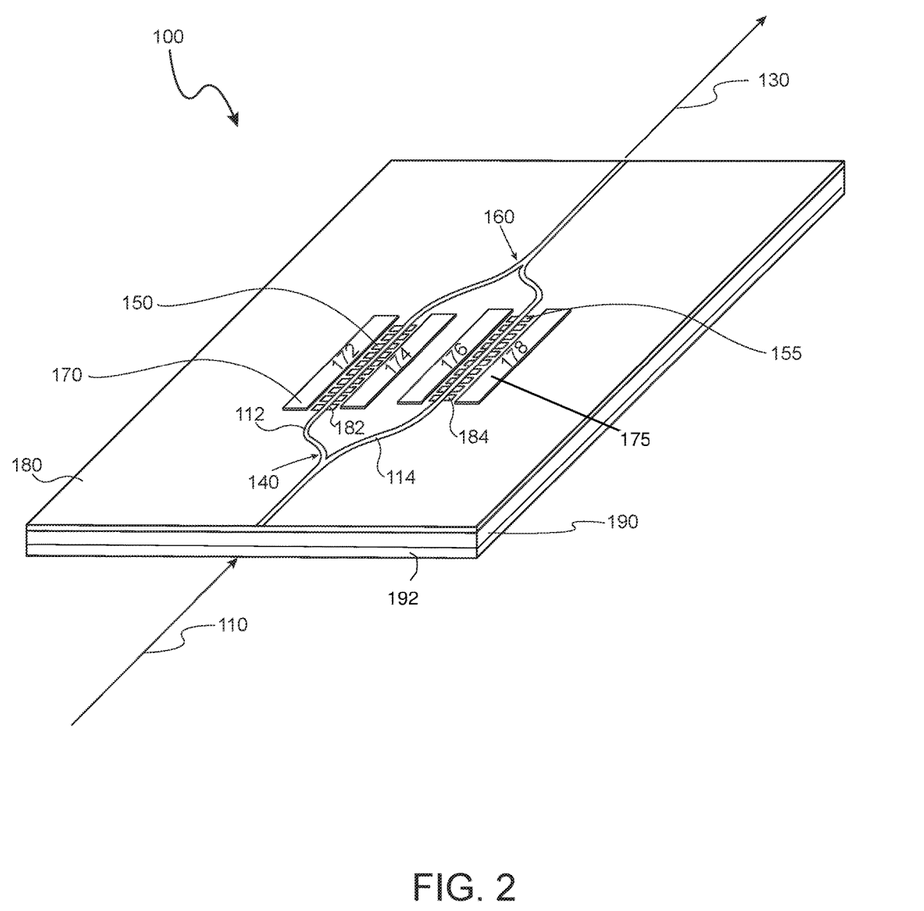
FIG. 2 provides a perspective view of an electro-optic modulator incorporating slot waveguides, in accordance with an aspect of this patent application.
Figure 3:
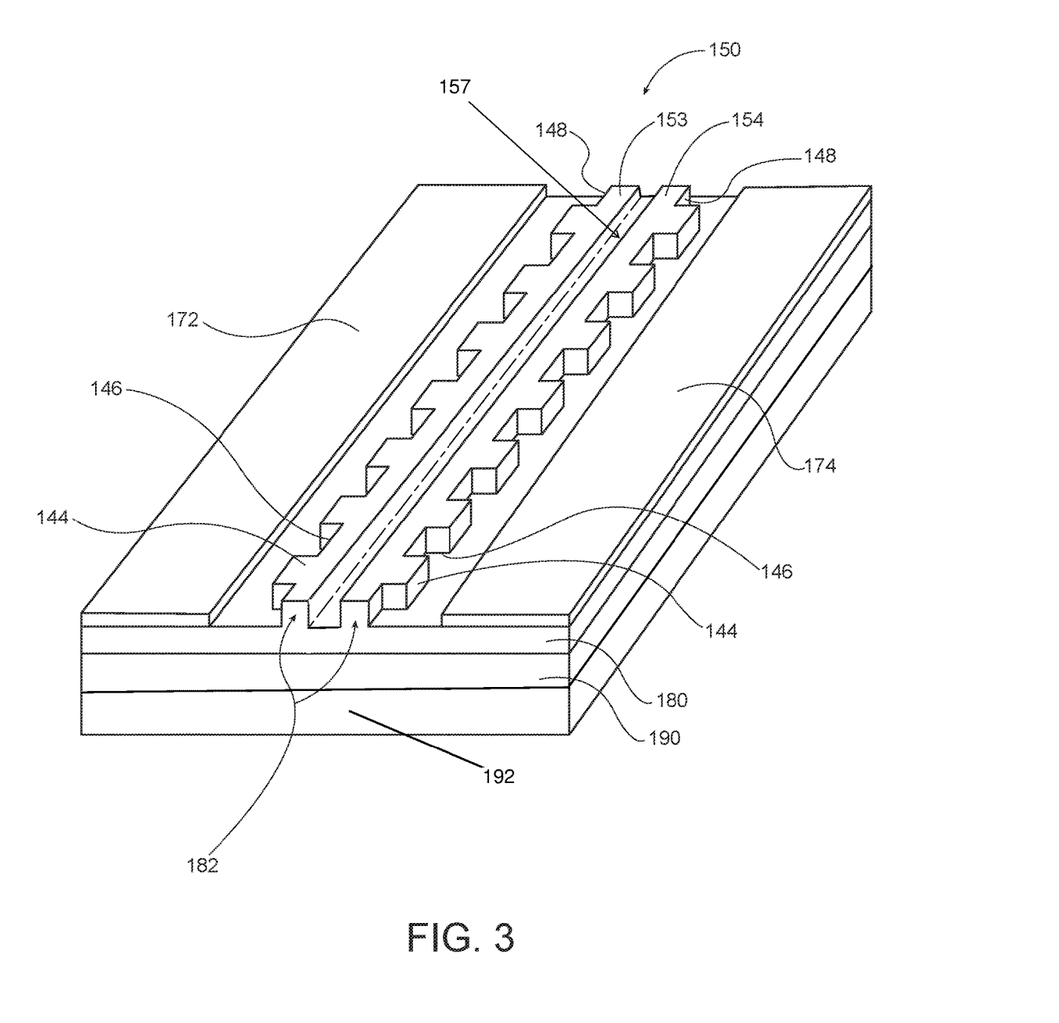
FIG. 3 provides a perspective view of a portion of the electro-optic modulator shown in FIG. 2, in accordance with an aspect of this patent application.

FIG. 2 provides a perspective view of the electro-optic modulator 100, according to one aspect of the present application. In one aspect of this patent application, the electro-optic modulator 100 shown in FIGS. 1-3 is a Mach-Zehnder type modulator. It should be noted, however, that the present application may be applicable to a wide variety of electro-optic modulators, for example, including but not limited to phase-only modulators. The modulator of FIG. 2 is shown for illustrative purposes. The approach of combining a width-modulated silicon slot waveguide with an electro-optic polymer can be implemented as either a single phase modulator or as an intensity modulator by incorporating multiple phase modulators in the arms of a Mach-Zehnder interferometer.

As shown, the electro-optic modulator 100 receives the optical input signal 110 to be modulated. The optical input signal 110 may be divided into two different portions by an optical splitting element 140. The optical splitting element 140 is configured to split the optical input signal 110 into a first optical signal 112 and a second optical signal 114. The optical splitting element 140 may split the optical input signal 110 in a 50-50 ratio or any other ratio appropriate for the RF-photonic link in which the electro-optic modulator 100 is deployed. Further, it will be appreciated by one of ordinary skill in the art that although the optical input signal 110 is illustrated as splitting into two signals—the first optical signal 112 and the second optical signal 114—in alternative aspects of this patent application, the optical input signal 110 may be split into a higher number of optical signals, e.g., 3, 4, etc. In yet another aspect of this patent application, the optical input signal 110 may not be split at all, without departing from the scope of the discussion herein.

The electro-optic modulator 100 may include a first slot waveguide 150 and a second slot waveguide 155. The first optical signal 112 and the second optical signal 114 may pass through the first and second slot waveguides 150, 155, respectively. The first slot waveguide 150 is configured to propagate the first optical signal 112. The second slot waveguide 155 is configured to propagate the second optical signal 114. As shown in FIG. 2, by way of example only, an optical path length of the first slot waveguide 150 is equal to an optical path length of the second slot waveguide 155. In an alternative arrangement, the respective optical path lengths of the first slot waveguide 150 and the second slot waveguide 155 may be different, or even adjustable, as will be appreciated by one of ordinary skill in the art reading this patent application.

The electro-optical modulator 100 may include an optical combining element 160. The optical combining element 160 may be configured to combine the two different portions of the optical input signal 110 to form the output optical signal 130. For example, the first optical signal 112 and the second optical signal 114 may be combined to form the optical output signal 130 that is modulated by the electrical input signal 120 shown in FIG. 1.

The electro-optic modulator 100 may also include two pairs of electrodes 170, 175. The electrical input signal 120 (shown in FIG. 1) is applied to the pairs of electrodes 170, 175. The pairs of electrodes 170, 175 are disposed on the silicon layer 180. The silicon layer 180 is deposited on a dielectric 190. The dielectric 190 may be a thick oxide grown on a silicon wafer substrate 192. Other materials, however, are possible for the underlying dielectric substrate or for the high index silicon layer 180 in which the waveguide structures 150, 155 are formed.

In one aspect of the application, the first pair of electrodes 170 including a first electrode 172 and a second electrode 174 is provided adjacent to the first slot waveguide 150. The first slot waveguide 150 may be etched out from the silicon layer 180 to expose the dielectric layer 190. For example, the first and second electrodes 172, 174 are provided above and below the first slot waveguide 150. That is, the first slot waveguide 150 is positioned in between the first and the second electrodes 172, 174. In one aspect, the first and second electrodes 172, 174 are provided adjacent the first slot waveguide 150, all in the same plane.

Likewise, the second pair of electrodes 175 including a third electrode 176 and a fourth electrode 178 is provided adjacent to the second slot waveguide 155. The second slot waveguide 155 may be etched out from the silicon layer 180 to expose the dielectric 190. For example, the third and fourth electrodes 176, 178 are provided above and below the second slot waveguide 155. That is, the second slot waveguide 155 is positioned in between the third and the fourth electrodes 176, 178. In one aspect the third and fourth electrodes 176, 178 are provided adjacent to the second slot waveguide 155, all in the same plane. In another aspect, the third and fourth electrodes 176, 178 together constitute a single electrode, designated as the ground electrode.

In one aspect of the patent application, each of the first and the second slot waveguides 150, 155, respectively, includes periodically modulated Bragg waveguide structures 182, 184 to enhance the photonic group index of the first and the second optical signals 112, 114, respectively. Enhancement of the photonic group index slows the first and the second optical signals 112, 114 in each of the first and the second slot waveguides 150, 155, respectively, making it possible for the electrical modulation signal 120 to modulate one or more of the first and the second optical signals 112, 114. The periodically modulated Bragg waveguide structures 182, 184 are "periodically modulated" in terms of a width of these structures having recessed and protruding portions, as illustrated in FIG. 3 using reference numerals 144 and 146.

The periodically modulated Bragg waveguide structures 182, 184 along with the first slot waveguide 150 and the second slot waveguide 155 form a CMOS-compatible silicon Bragg slot waveguide. Between each of the Bragg waveguide structures 182, 184 is a polymer that at least partially fills the slot waveguide 150 and the second slot waveguide 155. The polymer is a high EO coefficient polymer, for example, one with an EO coefficient on the order of 80 pm/V. In the high electro-optic coefficient polymer provided in the first and the second slot waveguides 150, 155, the respective optical fields of the first optical signal 112 and the second optical signal 114 are enhanced due to waveguide slot confinement provided by the Bragg waveguide structures 182, 184. Such enhancement in the optical field is also based upon increased interaction between the optical wave of the first optical signal 112 and the second optical signal 114 and the RF signal (e.g., electrical input signal 120) applied to the pairs of electrodes 170, 175. The Bragg waveguide structures 182, 184 on a silicon photonics platform further enhance the electro-optic response by using a high electro-optic coefficient polymer overlay in the first slot waveguide 150 and the second slot waveguide 155.

In one aspect, the electrical input signal 120 may be applied as a voltage across the first and the second electrodes 172, 174 and/or across the third and the fourth electrodes 176, 178. The EO modulator 100 may have a voltage sensitivity of up to 1 V (e.g., 0.1-0.5 V) with an insertion loss of less than 5 dB at a bandwidth of 100 GHz. In one aspect, the electrical modulation signal 120 in the additional second pair of electrodes 175 is a polarity reversed signal of the electrical modulation signal 120 in the first pair of electrodes 170.

In one aspect, the fabrication and measurements for the electro-optic modulator 100 are complemented by modeling the desired results, which leads to improved fabrication and selection of materials for the electro-optic modulator 100, as will be appreciated by one of ordinary skill in the art reading this patent application.

As shown in FIGS. 2 and 3, the pairs of electrodes 170, 175 extend parallel and adjacent to the slot waveguides 150, 155, respectively. For example, the first pair of electrodes 170 extends parallel and adjacent to the first slot waveguide 150. The second pair of electrodes 175 extends parallel and adjacent to the second slot waveguide 155.

In one aspect of the patent application, a first voltage may be applied to the first and the second electrodes 172, 174 creating a first electrical potential difference across them. Likewise, a second voltage may be applied to the third and the fourth electrodes 176, 178 creating a second electrical potential difference across them. The first and second voltages may be applied by one or more voltage sources (not shown) representative of the RF signal to be applied to the first and the second pair of electrodes 170, 175. Further, in one aspect, the first voltage is equal to the second voltage, and in an alternative aspect, the first and the second voltages may be different with opposite polarities to advance and/or delay the phases of first and the second optical signals 112, 114.

Therefore, by application of the first and second voltages, the refractive indices of the first and second slot waveguides 150, 155 may be changed. In some aspects of the present application, the first slot waveguide 150 and the second slot waveguide 155 may have different refractive indices. At least one electrode in the first and second pairs of electrodes 170, 175 carries the electrical modulation signal 120 to cause a phase change in at least one of the first optical signal 112 and/or the second optical signal 114 propagating through the slot waveguides 150, 155, respectively. The phase change occurs due to the change in the refractive index of the first and/or the second slot waveguide 150, 155.

The electro-optic modulator 100 shown in FIG. 2 advantageously employs a push-pull structure. In other words, the RF signal delivered to the first slot waveguide 150 is applied 180° out of phase with the RF signal delivered to the second waveguide 155.

Referring now to FIG. 3, an enlarged perspective representation of a portion of the electro-optic modulator 100 in FIG. 2 is shown, in accordance with an aspect of this patent application. By way of example only and not by way of limitation, FIG. 3 illustrates the portion of the electro-optic modulator 100 having the first slot waveguide 150 through which the first optical signal 112 passes, along with the first pair of electrodes 170. However, it will be appreciated by one of ordinary skill in the art reading this disclosure that the discussion with respect to FIG. 3 is equally applicable to the second slot waveguide 155 having the second pair of electrodes 175, as well as to other components of the second slot waveguide 155 that are similar to the components of the first slot waveguide 150.

The first slot waveguide 150 includes a slot region 157. The slot region 157 extends in the direction of light propagation (e.g., in the direction of propagation of the first optical signal 112). As shown, the slot region 157 is between two high refractive index regions 153, 154, respectively. The two high refractive index regions 153, 154 may form a Bragg grating with protrusions 144 and recesses 146. The Bragg gratings may be uniform gratings. Alternatively, the Bragg gratings may be patterned as non-uniform structures. Such uniform/non-uniform waveguide structures may be nanostructures fabricated using nano-fabrication techniques. The Bragg gratings slow the propagation of light in the first slot waveguide 150 so as to better match the propagation of the RF signal in the first pair of electrodes 150 formed parallel and adjacent to the slot region 157. As an exemplary result, the modulation of the first optical signal 112 can be performed at lower voltage than possible with conventional electro-optic modulation techniques, making the electro-optic modulator 100 highly sensitive as compared to the state of the art. Similar lower modulation voltage occurs for the second optical signal 114, when modulated.

In one aspect of the application, the high refractive index regions 153, 154 may be substantially parallel to each other as shown in FIG. 3. The slot region 157 and the high refractive index regions 153, 154 may be formed from silicon. Other high refractive index materials suitable for electro-optical modulation known in the art may be used and the application is not limited in this regard. The slot waveguide 150 shown in FIG. 3 is a ridge type waveguide. The slot waveguide 150, however, should not be limited to the ridge type Bragg waveguide structure 182 shown in FIGS. 2 and 3. In one aspect of this application, the plurality of recessed and protruding portions 146, 144, respectively, are formed on an outer side wall 148 of each of the high refractive index regions 153, 154 along the direction of propagation of the first and the second optical signals 112, 114.

The high refractive index regions 153, 154 are formed on the silicon layer 180, which is formed on the dielectric 190. That is, in the aspect shown FIG. 3, the high refractive index regions 153, 154 are defined in the silicon layer 180, which is deposited on the dielectric 190. The silicon layer 180 having the slot waveguide 150 and the dielectric 190 are used to support the high refractive index regions 153, 154. In one aspect of the application, the dielectric layer 190 may be formed from an insulating material, such as an oxide. For example, silicon dioxide may be used. Other materials, however, may also be used. It may be noted that the electro-optic modulator 100 has a waveguide structure that uses a silicon-on-insulator (SOI) platform but other systems are also contemplated by the present application. It may be appreciated by one of ordinary skill in the art that the dielectric 190 may further be supported on a relatively thicker substrate, such as the silicon wafer substrate 192.

The first slot waveguide 150 may include a cladding (not shown). For example, the first slot waveguide 150 may be formed with top cladding and/or bottom cladding. The first slot waveguide 150 may also be formed without top cladding and/or bottom cladding.

The high refractive index regions 153, 154 may extend along the surface of the dielectric layer 190 and are separated from each other by a certain distance to define the slot region 157. In other words, the slot region 157 is sandwiched between the two high refractive index regions 153, 154. The separation between the high refractive index regions 153, 154 defines a width of the slot region 157. The height of the high refractive index regions 153, 154 also defines the height of the slot region 157. The slot region 157 is configured to confine and concentrate the propagation of light, i.e., the first optical signal 112 in the example of FIG. 3.

According to one aspect of the application, the slot region 157 contains an electro-optic polymer material. This electro-optic polymer material may have a refractive index that is lower than the high refractive index regions 153, 154 that define the slot region 157. In one aspect, the electro-optic polymer material may completely fill the slot region 157. In another aspect, the slot region 157 may contain the electro-optic polymer material in addition to other low refractive index materials, such as air. In general, it should be noted that electro-optic polymers may be advantageous over other low-refractive index materials because the electro-optic polymer materials tend to have higher electro-optic coefficients, higher bandwidths, ultra-fast response times, low dielectric loss and greater compatibility with other materials and substrates. The aforementioned properties provide numerous advantages when using the electro-optic polymer for fabricating the electro-optic modulator 100.

For example, for the electro-optic polymer used in the slot region 157, the Pockels coefficient ($r_{33}$) may range from 70 to 250 pm/V. Some non-limiting examples of electro-optic polymers and materials include polymers manufactured by Soluxra LLC of Seattle, Wash. An electro-optic coefficient ($r_{33}$) defines the strength of the material's electro-optic effect. For example, an electro-optic coefficient value of 20-80 pm/V, or above, is desirable. Further, the electro-optic polymer may include nanoparticles mixed therewith, creating a hybrid EO-polymer nanocomposite.

Organic EO polymers have chromophores with permanent dipole moments that are randomly distributed. In order for the EO polymer to exhibit second-order nonlinearity, required for operation of the optical-modulator, the chromophores must be poled (aligned). Poling is a process that aligns the chromophores. General poling techniques include contact poling and corona poling. Contact poling requires heating the EO-polymer close to the EO polymer's glass transition, applying an electric field across the electrodes that contact the EO polymer, causing the dipoles to align, then cooling the EO polymer. The electric field is created by applying a poling voltage from about 100 volts (V) to about 1,000 V. Corona poling is similar to contact-poling, but the electric field is built up by charge accumulation on the surface of the EO-polymer by corona discharge of a conductor at high voltage.

According to another aspect of the application, the electro-optic polymer material is poled in a direction that is orthogonal to the direction of the light propagation vector of the first optical signal 112. Indeed, the discontinuity between the high refractive index regions 153, 154 and the low refractive index slot region 157 enhances the optical field in the slot region 157. The electro-optic material does not have to be a polymer, but may be non-polymeric material instead. Suitable electro-optic materials that are not polymers may include, but are not limited to, $LiNbO_3$, $LiTaO_3$, BSN, ADP, KIP, KTP, and $Ba_2NaNb_5O_{15}$.

In one aspect, the electro-optic polymer may be deposited in the slot region 157 such that the slot region 157 is completely filled with electro-optic polymer. The slot region 157 may alternatively be partially filled with the electro-optic polymer.

The slot region 157, or portions of the slot region 157, may also be filled with another material in addition to the electro-optic polymer. In some applications, it may be desirable to deposit another material into the slot region 157 to provide the Bragg waveguide structure 182 with different properties. For example, the slot region 157 may be filled with a nonlinear optic material, such as nonlinear glass or polymer. Materials to be used as low refractive index material may be among the classes of liquid crystals, rare-earth doped oxides, ferromagnetic materials, ferroelectric materials, polymers, organic materials, gases, liquids, etc. In some aspects, more than one electro-optic polymer may be deposited into the slot region 157.

In one aspect of the present application, the electro-optic modulator 100 meets desired SWaP requirements for on-chip processing of electrical and optical signals. For example, the electro-optic modulator 100 may be about 1-2 mm long and is therefore compatible with the size of an integrated photonic processor chip. This enables further integration in an RF photonic system including the electro-optic modulator 100 and photonic circuitry integrated onto a single chip.

Figure 4:
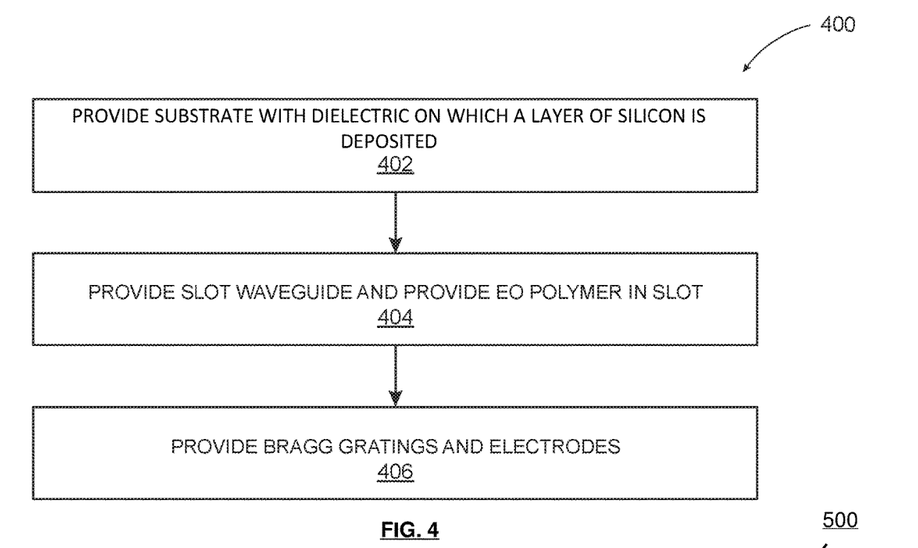
FIG. 4 illustrates an example method of manufacturing the electro-optic modulator of FIGS. 1-3, in accordance with an aspect of this patent application.

Referring to FIG. 4, a flowchart 400 illustrates techniques for fabricating the electro-optic modulator 100, in accordance with an aspect of this application. The fabrication method, shown in FIG. 4, may begin at a step 402 where the silicon layer 180 is deposited on the dielectric 190 (e.g., silica), which is provided on the silicon wafer substrate 192 (shown in FIG. 3). Then, in a step 404, the slot waveguides 150, 155 are formed by photolithography followed by etching of the silicon layer 180 to form a ridge waveguide (Bragg grating) with the slot region 157 in its center (e.g., as shown in FIG. 3). The slot region 157 may be partially or completely filled with an EO polymer. Poling of the EO polymer may be carried out in a direction orthogonal to the direction of light propagation in the slot waveguides 150, 155.

In a step 406, Bragg waveguide structures 182, 184 and the first electrode 172, the second electrode 174, the third electrode 176 and the fourth electrode 178 are deposited on the silicon layer 180. The third electrode 176 and the fourth electrode 178 may be electrically continuous and constitute a single electrode. These structures and electrodes may be formed by etching, deposition, or other microfabrication techniques. In one aspect of this application, the step 406 may be performed prior to the step 404, in which case the Bragg waveguide structures 182, 184 may be formed first and the space between the protrusions 144 and recesses 146 along the direction of propagation of the light may define the slot waveguides 150, 155, as illustrated in FIG. 3.

Figure 5:
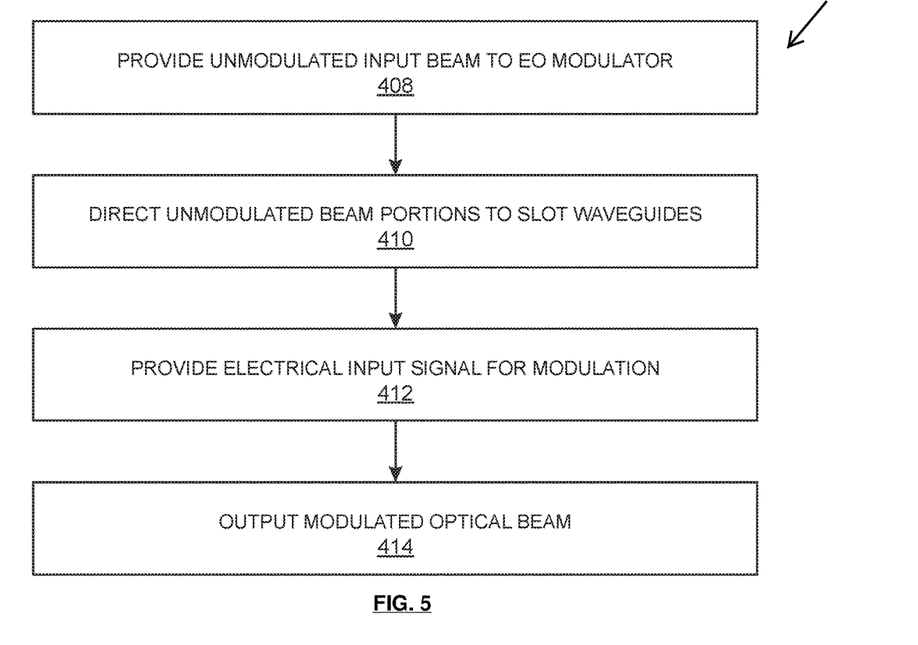
FIG. 5 illustrates an example method of modulating an unmodulated optical signal, in accordance with an aspect of this patent application.

Referring to FIG. 5, a flowchart 500 for modulating the input optical signal 110 is illustrated, in accordance with an aspect of this application. In a step 408, an unmodulated optical signal (e.g., the optical input signal 110) may be provided to an input of the first slot waveguide 150. For example, the optical input signal 110 may be split by the optical splitter 140 and the split portions may each be respectively input to the first slot waveguide 150 and the second slot waveguide 155, respectively. Then, in a step 410, the unmodulated optical signal may be directed through the low refractive index slot region 157 of the first slot waveguide 150 and the second slot waveguide 155, respectively, having the EO polymer.

In a step 412, the electrical input signal 120 is provided to one or more of the first slot waveguide 150 and the second slot waveguide 155 to induce a change in a refractive index of the first slot waveguide 150 and the second slot waveguide 155, respectively. The electrical input signal 120 may be applied across the first electrode 172, the second electrode 174, the third electrode 176 and the fourth electrode 178. The electrical input signal 120 may be applied such that a "push-pull" type modulation may be carried out upon the input optical signal 110 by having opposite polarities of the electrical input signal 120 being applied to the first and the second pair of electrodes 170, 175, respectively. For example, the first optical signal 112 may be have a negative phase change by the electrical input signal 120 while the second optical signal 114 may have a positive phase change due to modulation by the electrical input signal 120. In one aspect, the phase difference between the first optical signal 112 and the second optical signal 114 may be 180°.

Then, in a step 414, a modulated optical signal (e.g., the output optical signal 130) is outputted corresponding to a phase change of the unmodulated optical signal by the electrical input signal 120. The modulated optical signal may be the result of an interaction between the first optical signal 112 that was modulated and the second optical signal 114 that may or may not have been modulated. The first optical signal 112 and the second optical signal 114 may interact with each other and combine (e.g., at the optical combiner 160) to form the output optical signal 130.

In various aspects of this application, the discussed technique(s) involve(s) depositing the electro-optic polymer into trenches (e.g., slots of the slot waveguides 150, 155) formed in a silicon photonic substrate. Subsequently, the electro-optic polymer is poled. Then, characterization of modulator voltage, frequency response, and insertion loss are performed.

Transferring RF signals into the optical domain facilitates more complex processing, and efficient, lightweight distribution of wideband and millimeter-wave signals. This is due to bulky RF cables being much lossier than optical fibers. Further, the ability to analyze data over a wide bandwidth enables complexity in processing RF signals in the optical domain.

Processing data with photonics facilitates sensing larger bandwidths with lower SWaP. It also provides immunity from electromagnetic interference. Further, it includes the possibility of integrating multiple functionalities in addition to the modulator on the same platform. RF photonics is at the heart of beamforming systems for transmitting data using phased antenna arrays of systems used for filtering data for signals at specific frequencies. RF photonics also mitigates jamming (e.g., reducing sensor vulnerability to jamming). It is realized that the overall performance of RF photonics depends on the electro-optic modulator 100. In addition to RF photonics, various aspects of this patent application related to the structure shown in FIGS. 2 and 3 and the methods in FIGS. 4 and 5 are applicable to any system that can benefit from a low drive voltage.

Sensing signals and analyzing them for information at specific frequencies and communications is important. RF photonics links with low noise figures, large bandwidths, high gain and large dynamic range can have a significant impact on both of these broad application areas: sensing signals and performing signal analysis.

The voltage sensitivity of the electro-optic modulator 100 also impacts the noise figure of the RF link. Generally, noise figure, link gain, and spur-free dynamic range are all degraded as the $V_\pi$ of the modulator increases. Thus, achieving a lower $V_\pi$ according to various aspects of this patent application enables the capability to use RF photonics for sensitive RF sensing. Determining overall sensitivity to RF signals is therefore an important attribute for various implementations of the highly voltage sensitive electro-optic modulator 100.

According to an aspect of the application, the electro-optic modulator 100 exhibits half-wave voltages around 1 V despite a small $V_\pi L$ product because the EO coefficient of the polymer and the optical field inside the slot region 157 are high, L being the optical path length for the optical signal (e.g., the first optical signal 112). Usually, for $V_\pi$ to be small, if the electro-optic coefficient is relatively low, the length L is large in order to ensure that the $V_\pi L$ product is large. The product $V_\pi L$ is multiplied by $r_{33}$ to produce the electro-optic phase shift (or, a quantity proportional to it), which needs to reach a fixed value (=$\pi$). In an aspect, shown for example in FIG. 2 and FIG. 3, the $V_\pi$ is lowered by fabricating a silicon waveguide with a periodic nanostructure having a poled polymer with a high electro-optic coefficient. Since the refractive index of the polymer is relatively high, the optical mode of the propagating signal is expected to have significant overlap with the polymer.

The low-$V_\pi$ modulator implemented using the electro-optic modulator 100 spans across all RF photonic applications. Reduction of $V_\pi$ for a modulator is important for RF photonics due to the small signal voltages in RF signal sensing. Developing a low-$V_\pi$ modulator and employing it in a RF photonics system enables extremely wideband sensitive RF sensors.

It is to be understood that this patent application is not limited in its application to the details of construction and to the arrangements of the components set forth in the following description or illustrated in the drawings. The patent application provides aspects in addition to those described, practiced and/or carried out in various ways. Also, it is to be understood that the phraseology and terminology employed herein, as well as the abstract, are for the purpose of description and should not be regarded as limiting.

Reference in this application to "one aspect," "an aspect," "one or more embodiments," or the like means that a particular feature, structure, or characteristic described in connection with the aspect is included in at least one aspect of the application. The appearances of, for example, the phrase "an aspect" in various places in the specification are not necessarily all referring to the same aspect, nor are separate or alternative aspects mutually always exclusive of other aspects. Moreover, various features are described which may be exhibited by some aspects and not by the other. Similarly, various requirements are described which may be requirements for some aspects but not by other aspects.

While the system and method have been described in terms of what are presently considered to be specific aspects, the patent application need not be limited to the discussed aspects. It is intended to cover various modifications and similar arrangements included within the spirit and scope of the claims, the scope of which should be accorded the broadest reasonable interpretation so as to encompass all such modifications and similar structures.

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this application belongs.

As used in the specification and the appended claims, the singular forms "a," "an" and "the" include plural equivalents unless the context clearly dictates otherwise. Ranges can be expressed herein as from one particular value to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values discussed herein, and that each value is also herein discussed as "about" that particular value in addition to the value itself. For example, if the value "10" is discussed, then "about 10" is also discussed. It is also understood that each unit between two particular units are also discussed. For example, if 10 and 15 are discussed, then 11, 12, 13, and 14 are also discussed.

That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the term "light" means electromagnetic radiation including ultraviolet, visible or infrared radiation.

As used herein, the term "transparent" means that the level of transmittance for a discussed composition is greater than 50%. In some embodiments, the transmittance can be at least 60%, 70%, 80%, 85%, 90%, or 95%, or any range of transmittance values derived from the above exemplified values. In the definition of "transparent", the term "transmittance" refers to the amount of incident light that passes through a sample measured in accordance with ASTM D1003 at a thickness of 3.2 millimeters.

As used herein, the term "layer" includes sheets, foils, films, laminations, coatings, blends of organic polymers, metal plating, and adhesion layer(s), for example. Further, a "layer" as used herein need not be planar, but may alternatively be folded, bent or otherwise contoured in at least one direction, for example.

Unless otherwise stated to the contrary herein, all test standards are the most recent standard in effect at the time of filing this application.

The invention claimed is:
1. A method of modulating an optical signal, comprising:
  receiving an unmodulated optical signal input to a slot waveguide having:
    a slot in a direction of propagation of the unmodulated optical signal, the slot being filled at least partially with an electro-optic polymer poled orthogonal to the direction of propagation, and Bragg gratings defined along sides of the slot to slow the optical signal;

modulating a phase of the unmodulated optical signal by providing an electrical input signal to the slot waveguide via a pair of electrodes; and outputting a modulated optical signal with the modulated phase.

2. The method of claim 1, further comprising:

splitting the unmodulated optical signal prior to the slot waveguide into a first optical signal and a second optical signal, wherein the first optical signal is modulated by the electrical input signal;

passing the second optical signal through an additional slot waveguide; and combining the modulated first optical signal and the second optical signal to form the modulated optical signal.

3. The method of claim 2, wherein the second optical signal is modulated by an additional electrical input signal prior to the combining step.

4. The method of claim 3, wherein the modulating includes delaying the phase of the first optical signal and/or advancing the phase of the second optical signal.

5. The method of claim 2, wherein the second optical signal is passed unmodulated through the additional slot waveguide prior to the combining step.

6. The method of claim 1, wherein the electrical input signal is a voltage signal and the modulation is carried out by applying the voltage signal to a pair of electrodes adjacent to the slot waveguide.

7. An electro-optic modulator for modulating an unmodulated optical signal, the electro-optic modulator comprising:

a slot waveguide configured to propagate an optical signal, the slot waveguide including a slot and Bragg gratings defined by outer walls of the slot, the Bragg gratings configured to slow the optical signal; and a pair of electrodes extending parallel and adjacent to the slot waveguide, electrodes in the pair configured to carry an electrical modulation signal to induce a change in a phase of the optical signal, wherein the slot of the slot waveguide is at least partially filled with an electro-optic polymer poled in a direction orthogonal to a direction of propagation of the optical signal in the slot waveguide.

8. The electro-optic modulator of claim 7, wherein the Bragg gratings are periodic structures whose widths are modulated by recessed and protruding portions.

9. The electro-optic modulator of claim 7, wherein the slot having the electro-optic polymeric material defines a low refractive index region, and the Bragg gratings formed on the outer walls of the slot define a high refractive index region.

10. The electro-optic modulator of claim 7, wherein the slot is filled with a non-polymeric electro-optic material.

11. An integrated photonic circuit comprising the electro-optic modulator of claim 7.

12. The electro-optic modulator of claim 7, wherein the electro-optic modulator is fabricated by a CMOS-compatible silicon photonic fabrication technique.

13. The electro-optic modulator of claim 7, further comprising:

an optical splitting element configured to split the unmodulated optical signal into a first optical signal and a second optical signal, the first optical signal being propagated through the slot waveguide;

an additional slot waveguide configured to propagate the second optical signal; and an optical combining element configured to combine the first optical signal and the second optical signal to form a modulated optical signal.

14. The electro-optic modulator of claim 13, wherein the additional slot waveguide includes:

an additional slot and additional Bragg gratings disposed on both outer walls of the additional slot, the additional Bragg gratings configured to slow the second optical signal; and an additional pair of electrodes extending parallel and adjacent to the additional slot waveguide.

15. The electro-optic modulator of claim 14, wherein electrodes in the additional pair are configured to carry another electrical modulation signal to induce a change in the phase of the second optical signal.

16. The electro-optic modulator of claim 15, wherein the electrical modulation signal in the additional pair of electrodes is a polarity reversed signal of the first pair of electrodes.

17. The electro-optic modulator of claim 13, wherein the second optical signal is unmodulated prior to being combined with the first optical signal at the optical combining element.

18. The electro-optic modulator of claim 11, wherein the electro-optic modulator is a Mach-Zehnder interferometer type modulator.

19. The electro-optic modulator of claim 7, wherein the electro-optic modulator has at least one of the following attributes:

a half-wave voltage $V_\pi$ less than 1 V, an insertion loss less than 5 dB, and a bandwidth of at least 100 GHz.

20. A slot waveguide for electro-optic modulation, comprising:

a slot and Bragg gratings defined by outer walls of the slot, the Bragg gratings configured to slow an optical signal, the slot defining a low-refractive index region and the Bragg gratings spaced apart by the slot defining a high-refractive index region; and a pair of electrodes extending parallel and adjacent to the slot waveguide, the electrodes configured to carry an electrical modulation signal to induce a change in a phase of the optical signal, wherein the slot of the slot waveguide is at least partially filled with an electro-optic polymeric material poled in a direction orthogonal to a direction of propagation of the optical signal in the slot waveguide.

* * * * *